Dec. 21, 1926.
F. H. FARRINGTON
COTTON STALK HARVESTER
Filed Sept. 20, 1924
1,611,825
2 Sheets-Sheet 1
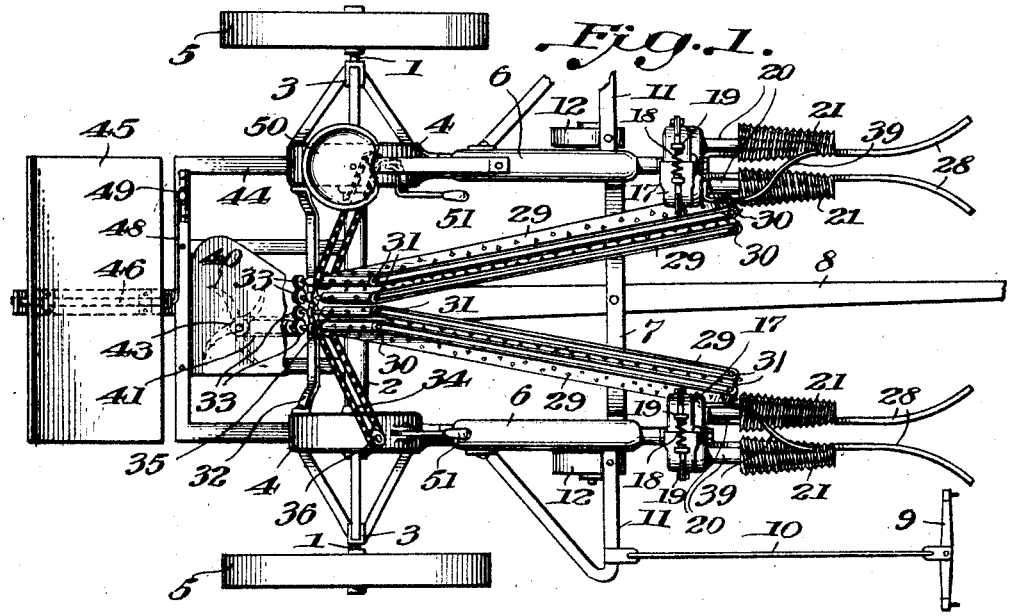

Dec. 21, 1926.  
F. H. FARRINGTON  
1,611,825  
COTTON STALK HARVESTER  
Filed Sept. 20, 1924  
2 Sheets-Sheet 2
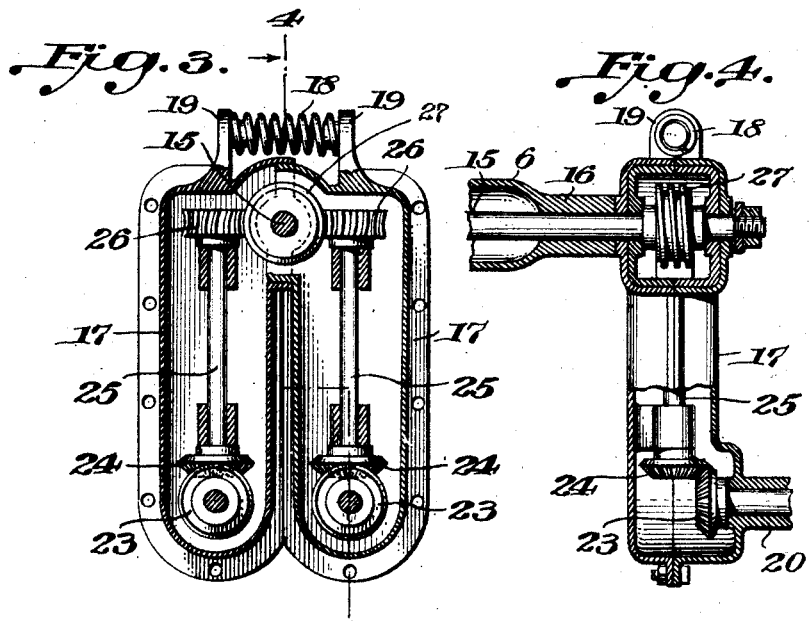
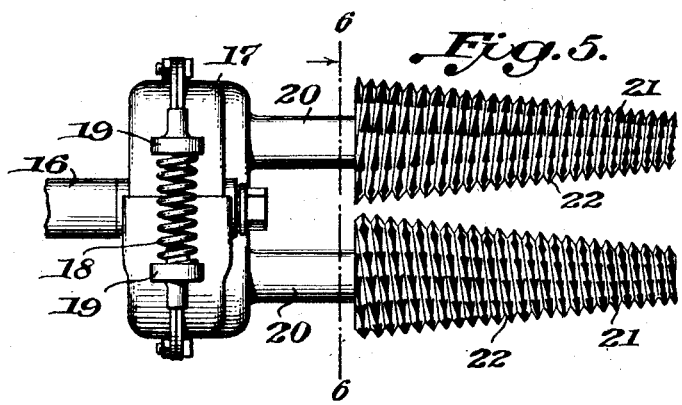
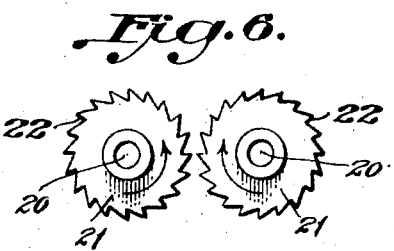

Patented Dec. 21, 1926.

1,611,825

UNITED STATES PATENT OFFICE.

FRANK H. FARRINGTON, OF BIRMINGHAM, ALABAMA.

COTTON-STALK HARVESTER.

Application filed September 20, 1924. Serial No. 738,836.

This invention relates to cotton stalk harvesters, the object being to pull the stalks up, transfer them in practically an upright position to a binding device from which the bundles after being bound are delivered to a receiving platform, the latter being tilted at intervals for depositing the bundles on the ground in piles.

In the accompanying drawings:—

Fig. 1 is a top plan view of the harvester;

Fig. 2 is a side elevation thereof;

Fig. 3 is a detail sectional view through the stalk-pulling mechanism taken on line 3—3 of Fig. 2;

Fig. 4 is a sectional view taken on line 4—4 of Fig. 3;

Fig. 5 is a detail plan view of the stalk pulling mechanism;

Fig. 6 is a detailed end view of the stalk pulling rolls taken on the line 6—6 of Fig. 5.

The numeral 1 indicates a rear axle rotatably supported in a housing 2, the outer ends of the axle projecting beyond the housing and supported in suitable bearings 3—3 carried by the gear housings 4—4 located at the outer ends of the axle housing 2. The numerals 5—5 indicate the traction wheels mounted upon and supporting the axle 1.

Extending forwardly from the gear housings 4—4 is a frame consisting of hollow tubular members 6—6 secured together at their outer ends by means of a cross-bar 7. The numeral 8 indicates a tongue arranged centrally of the main frame, and the numeral 9 indicates the whiffle-trees connected by links 10 to brackets 11 extending laterally from the hollow tubular members 6. Caster-wheels 12—12 are suspended from the forward ends of the tubular members 6—6.

Keyed to the axle 1 at each end thereof within each of the housings 4—4 is a bevel gear 13, which meshes with a pinion 14, keyed to drive-shaft 15, the outer end of which is received in a bearing 16 at the extreme outer end of the tubular housing 6. Pivotally mounted on the outer end of the drive-shaft 15 is a gear housing consisting of two hollow casings 17—17 normally held together by an expansion spring 18 arranged between two upwardly projecting lugs 19—19. Rotatably journaled at the lower end of each of the casings 17 in the bearing 20—20 is a cone-shaped stalk puller 21, these stalk pullers being preferably ribbed or threaded and notched as at 22. Secured to the inner ends of each of the stalk-pullers 21, is a pinion 23 within the casing 17, each of said pinions meshing with a pinion 24 keyed to a vertical shaft 25 mounted for rotation within the casing 17. Keyed to the upper end of the vertical shaft 25 is a worm-gear 26, which meshes with a worm 27 keyed to the outer end of the shaft 15.

By this arrangement of driving mechanism, the cone-shaped stalk-pullers are caused to turn toward each other withdrawing the stalks from the ground. As a means for guiding the stalk toward the stalk-pullers, I preferably provide a pair of guides 28—28 secured to each of the casings 17, extending below and forwardly of the stalk-pullers. As will be seen, the stalk-pullers and guides swing transversely in case the plants are more or less out of line, and should the stalks be too bulky the stalk-pullers will spread with relation to each other under tension to eliminate possible choking.

After being pulled, it is desirable to bind the plants into bundles, for which purpose I preferably provide two pairs of endless conveyers 29—29. The forward ends of these endless conveyers are supported for rotation upon two rollers 30—30, which stand substantially in a vertical position. These endless conveyers converge rearwardly and are supported upon suitable rollers 31—31, which are rotatably supported, upon a suitable cross-bar 32. Each pair of rollers 31—31 is provided with intermeshing gears 33—33, the outer rollers of which are connected by a driving-chain 34 and sprockets 35 and 36, the latter being keyed to a stub-shaft 37, the lower end of which is provided with a pinion 38 which meshes with the bevel gear 13 keyed to the drive-shaft 1. Guides 39 arranged over the stalk-pullers serve to direct the stalks from the rollers to the endless conveyers.

Arranged at the rear of the inner ends of the endless conveyers is a binding device 40 which derives its power by means of an endless belt 41 surrounding a pulley 42 keyed to the lower end of one of the rollers 31 and a pulley 43 keyed to the shaft of the binder 40.

Extending rearwardly of the machine is a frame 44 upon which is supported a platform 45, which is preferably mounted on an oscillating shaft 46, to the inner end of which is secured a rock-arm 47 connected by a link 48 to and controlled by a lever 49, by which the platform may be tilted at intervals to expel the bundles from either side of the machine. A seat 50 is secured to the main frame and adjacent thereto are shift-levers 51—51 which serve to disengage the pinions 14 from the main drive to silence the stalk-pullers when desirable.

As thus will be seen, I have devised a cotton stalk harvester, which, as it is drawn along between the rows, will gather the cotton stalks, transfer them to a binding device, and then deliver them to an expelling platform from which they are expelled at intervals as desired. It is understood that many changes may be made in the construction of this machine without departing from the general scope of the invention involved.

I claim:

1. In a harvesting machine, the combination of a drive shaft, housings extending laterally from said drive shafts, driven shafts mounted in the housings and connected with the drive shaft, a gear box depending from each of said laterally extending housings, pulling mechanism extending outwardly from the gear boxes, and means for driving the pulling mechanism from the driven shafts.

2. In a harvesting machine, the combination of a frame, a split pivoted casing, pulling means carried by said casing, driving means for said pulling means, and conveyors associated with the pulling means.

3. In a harvesting machine, the combination of a frame, a drive shaft, a split pivoted casing carried by said frame, pulling means carried by said casing, means operatively connecting the drive shaft with the pulling means, and endless conveyors associated with the pulling means.

4. In a harvesting machine, the combination of a drive shaft, driving gears mounted thereon, housings extending laterally from said drive shaft, driven-shafts mounted in the housings, pinions mounted on said driven shafts and meshing with the driving gears, gear boxes depending from said laterally extending housings and having gearing therein actuated by said driven shafts, and pulling mechanism extending outwardly from each of said gear boxes and driven by the gearing therein.

5. In a cotton stalk harvesting machine, the combination of a frame, traction wheels supporting said frame, a plurality of pulling mechanisms comprising a split pivoted casing, rotary pulling members pivoted at the lower end of each of the casings, driving means interposed between said traction wheels and said rotary pullers and common to both, and a pair of inclined vertically disposed endless conveyers having parallel opposed portions for conveying the stalks from the rotary pullers.

6. In a cotton stalk harvesting machine, the combination of a frame, traction wheels supporting said frame, a plurality of pulling mechanisms, comprising a split pivoted casing, rotary pulling members pivoted at the lower end of each of the casings, driving means interposed between said traction-wheels and said rotary pullers and common to both, and a pair of converging inclined vertically disposed endless conveyers having parallel opposed portions, for conveying the material from the rotary pullers, and a binding means arranged at the rear of said endless conveyers.

7. In a cotton stalk harvesting machine, the combination of a frame, traction wheels supporting said frame, a plurality of pulling mechanisms, comprising a split pivoted casing, rotary pulling members pivoted at the lower end of each of the casings, driving means interposed between said traction-wheels and said rotary pullers and common to both, a pair of converging inclined vertically disposed endless conveyers having parallel opposed portions for conveying the material from the rotary pullers, a binding means arranged at the rear of said endless conveyers, and a pivotally mounted receiving platform arranged at the rear of said binding mechanism.

In testimony whereof I affix my signature.

FRANK H. FARRINGTON.